(12) United States Patent
Catalano

(10) Patent No.: US 7,159,554 B2
(45) Date of Patent: Jan. 9, 2007

(54) METHOD AND DEVICE FOR MANAGING THE VEHICLE WARM-UP PHASE IN A COLD START SITUATION BY CONTROLLING A HYDRAULIC RETARDER

(75) Inventor: Claudio Catalano, Milan (IT)

(73) Assignee: Astra Veicoli Industriali S.p.A., Piacenza (IT)

( * ) Notice: Subject to any disclaimer, the term of this patent is extended or adjusted under 35 U.S.C. 154(b) by 0 days.

(21) Appl. No.: 11/020,934

(22) Filed: Dec. 23, 2004

(65) Prior Publication Data

US 2005/0166881 A1   Aug. 4, 2005

(30) Foreign Application Priority Data

Jan. 29, 2004   (IT) .......................... MI2004A0128

(51) Int. Cl.
   *F02N 17/06*   (2006.01)
(52) U.S. Cl. ............................................. 123/142.5 R
(58) Field of Classification Search ......... 123/142.5 R, 123/179.1, 41.33
   See application file for complete search history.

(56) References Cited

U.S. PATENT DOCUMENTS

| 5,852,995 | A | * | 12/1998 | Aoki et al. | ............ | 123/339.16 |
| 5,899,183 | A | * | 5/1999 | Aoki et al. | ............ | 123/142.5 R |
| 5,931,380 | A | * | 8/1999 | Aoki et al. | ............ | 237/12.3 B |
| 5,938,115 | A | * | 8/1999 | Aoki et al. | ............ | 237/12.3 R |
| 6,244,232 | B1 | * | 6/2001 | Ban et al. | ............ | 123/142.5 R |

\* cited by examiner

*Primary Examiner*—Stephen K. Cronin
*Assistant Examiner*—Jason Benton
(74) *Attorney, Agent, or Firm*—Sampson & Associates, P.C.

(57) ABSTRACT

This invention relates to a method for managing the vehicle warm-up phase in a cold start situation. The vehicle is equipped with a hydraulic retarder upstream of the set of gears of the transmission that dissipates heat in the engine coolant. Said method is based on the use of the hydraulic retarder, with the vehicle at a standstill, to accelerate the vehicle warm-up phase, in particular the warming of the cabin, the transmission oil, the oil of the brake cooling system and the engine cooling water.

23 Claims, 1 Drawing Sheet

METHOD AND DEVICE FOR MANAGING THE VEHICLE WARM-UP PHASE IN A COLD START SITUATION BY CONTROLLING A HYDRAULIC RETARDER

This application claims priority to Italian patent application No. MI 2004 A 000128 filed on Jan. 29, 2004.

BACKGROUND OF THE INVENTION

1. Field of the Invention

This invention relates to a method and device for managing the vehicle warm-up phase in a cold start situation by controlling a hydraulic retarder.

2. Description of the Prior Art

Some types of vehicles, especially, but not exclusively, industrial or commercial vehicles, are required to work in extremely low outdoor temperatures, where they may also remain out of service for a prolonged period of time; this may be the case, for example, in arctic conditions or wherever the temperature falls well below zero at night. In such conditions, when these vehicles are (re)started it takes them a long time to reach the steady state, especially as regards the temperature of the engine coolant, engine lubricating oil, transmission oil and the oil of the brake cooling system, in vehicles equipped with oil-bath brakes. The following advantages can be achieved by reducing warm-up times:

The vehicle is ready for use more quickly (in many automatic transmissions the gears cannot be selected if the oil is below a given temperature, which means that the vehicle cannot move). In particularly cold conditions, even if the engine idles for a prolonged period of time the engine coolant does not rise to above 50–60° C.;

Rapid defrosting of passenger compartment windows and achievement of the required temperature inside the cabin;

Less likelihood of jerky movements in a cold start situation, for example when the driver is impatient to get started;

Reduced wear on the engine, since this is not made to run for several tens of minutes with loose-fitting mechanical parts and less than optimal lubrication conditions;

Less engine fouling due to a reduction in the number of "misfiring" events that are due to the low temperature of the combustion chambers with the engine idling;

Reduction of atmospheric pollution during the warm-up phase as a consequence of the reduced number of "misfiring" events, which generate high levels of CO (carbon monoxide) and HC (unburnt hydrocarbons), both of which are extremely harmful.

The use of electric resistance heaters to cut warm-up times is known in the prior art. This solution has often been used in the past in mechanical injection engines (that have more problems in cold start conditions than electronic injection engines), but it involves expensive adjustments to the vehicle in order to install the necessary components. Furthermore, problems may arise when connecting the resistances to the electric circuits, which may be outside the vehicle, and energy consumption is high.

In some industrial applications where the costs involved are particularly high and vehicles are required to work in extremely harsh environmental conditions, the braking system is often housed in a sealed oil bath to guarantee high braking torques while enhancing the vehicle's service life.

There may be two different fluids/circuits in the braking chambers:
the brake fluid, that flows under high pressure, up to and above 100 bar;
the brake cooling oil, which is separate from the brake fluid and ideally requires minimum backpressure levels (usually between 2 and 6 bar) that are strongly influenced by the operating temperature. The backpressure threshold depends on the type of seal that is used and prevents the risk of cross-contamination between the two oils. It is easy to maintain low backpressure levels under normal working conditions, with an oil temperature of approximately 80° C., but this becomes more difficult in cold start conditions, with outdoor temperatures of less than 5° C., due to the significant increase in the viscosity of the oil.

In order to overcome this drawback the flow rate of the cooling oil must be reduced until this has warmed up sufficiently. During this time the brakes are not fully operational, in that only a part of the oil that is available is circulating. In this phase excessive use of the brakes could cause irreversible damage.

Hence reducing the time required for the oil in the brake cooling system to warm up should be beneficial in order to increase reliability and safety.

SUMMARY OF THE INVENTION

The purpose of this invention is to overcome all the drawbacks described above with a method and device for managing the vehicle warm-up phase in a cold start situation by exploiting the presence of a hydraulic retarder (retarder or hydraulic brake), in order to reduce the time required for all of the vehicle systems to warm up.

This invention relates to a method for managing the vehicle warm-up phase in a cold start situation, said vehicle being equipped with a hydraulic retarder with hydraulic circuit connected to a heat exchanger that exchanges heat with an engine coolant, characterized in that said warm-up in a cold start situation comprises a phase in which said hydraulic retarder is activated with the vehicle at a standstill.

This invention also relates to a device that manages all phases of vehicle warm-up in a cold start situation by controlling a hydraulic retarder, as described more fully in the claims, which are an integral part of this description.

BRIEF DESCRIPTION OF THE DRAWINGS

The purposes and advantages of this invention will become clear from the following detailed description of a preferred embodiment and the relative alternative forms of embodiment and the drawing that is attached hereto, which are merely illustrative and not limitative.

BEST MODE FOR CARRYING OUT THE INVENTION

Figure 1:
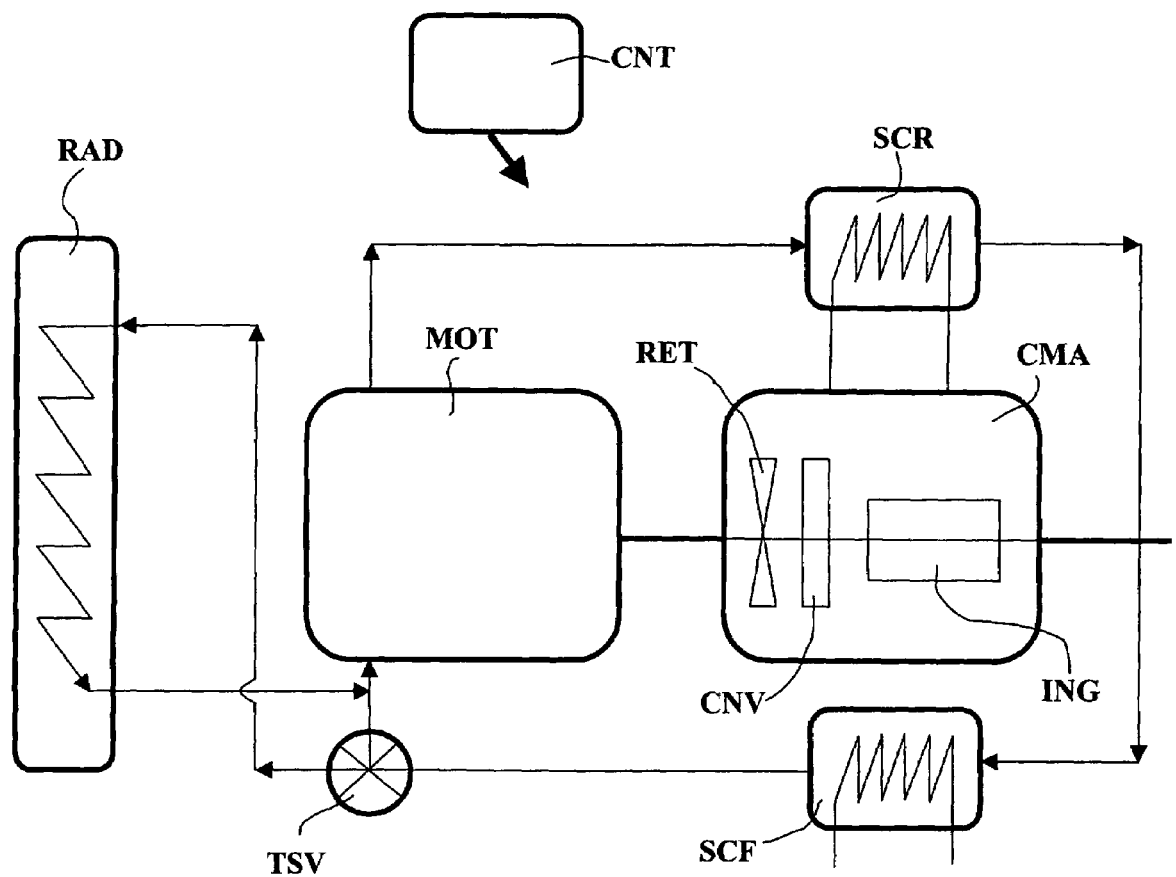
FIG. 1 is a block diagram of an engine that embodies the method according to this invention.

In FIG. 1, MOT indicates an engine of a type known in the art. The construction details of said engine are known and for this reason they are not described here.

CMA indicates an automatic transmission assembly, equipped with a primary drive shaft on the engine side, and a secondary drive shaft that delivers torque to the wheels, which are not shown. Inside CMA there are preferably a hydraulic retarder RET, called a retarder, a device called a "Torque Converter" CNV that acts as a hydraulic clutch, and the set of the transmission gears, illustrated schematically, for example as a series of epicyclic gears that transfer motion to the wheels.

There is an electronic vehicle control unit CNT that also coordinates the functions of the engine and transmission.

In this non-limitative example the vehicle is fitted with an automatic transmission.

Since this type of vehicle must travel long distances on downhill gradients of approximately 30% while heavily loaded, it requires an extremely reliable auxiliary braking system.

The auxiliary brake consists of the hydraulic retarder RET that is integrated into the automatic transmission and installed downstream of the converter. The retarder consists of an oil-bath turbine that, when it turns, acts as a brake, dissipating mechanical energy in the oil in which it is immersed, thus significantly increasing the temperature of said oil. This phenomenon requires the presence of an auxiliary cooling circuit. Retarder operation normally requires the accelerator pedal to be released to exclude the power from the engine and a gear must be engaged, so that the power from the wheels can be transferred to the Retarder and from here dissipated into heat.

CMA and RET use the same oil, which is cooled by means of an oil/water exchanger SCR.

There is also another water/oil heat exchanger SCF that cools the hydraulic oil in the braking circuit.

The engine illustrated in FIG. 1 is cooled by means of a fluid circuit in which said fluid is mainly water. The water follows the path illustrated by the arrows in FIG. 1. The water leaves the engine MOT and then passes through the transmission water/oil heat exchanger SCR; it then passes through the other water/oil heat exchanger SCF of the braking system; it then flows to the main radiator RAD through a thermostatic valve TSV, before returning to the engine. The thermostatic valve controls the water temperature in a way that is known in the art, controlling the amount of water that, coming from the heat exchanger SCF, goes to the radiator RAD or directly to the engine MOT.

The cooling requirements of the system are satisfied by means of a coolant circuit (the coolant is mainly water) that exchanges heat through the engine radiator, the transmission/retarder heat exchanger and the brake heat exchanger.

According to this invention the hydraulic retarder RET is used to speed the vehicle warm-up process in cold start conditions, by heating the circulating fluids.

In this case the retarder is not used in the conventional way: instead of dissipating the braking power from the wheels, it is used to increase the engine load and dissipate in heat the extra power that is requested but not used while the engine is idling, with the vehicle at a standstill.

The method according to this invention is now described.

The engine is started with the vehicle parked and the gear in neutral. This operation may be performed from the ground, by operating a pushbutton on the outside of the vehicle. Since the gear is in neutral when the engine is started, the shaft on the engine side turns but the shaft to the wheels does not.

For safety reasons, a number of conditions must be satisfied in order to authorize the activation of the procedure: the gear must be in the neutral position, the ignition key must not be inserted in the instrument panel, the parking brake must be engaged and the transmission output shaft speed sensor must indicate zero. Only in these conditions is the vehicle considered to be at a standstill and the procedure can be implemented. In an initial starting phase, called CRANK-ING, the engine is made to run at minimum rpm. The duration of this phase depends on the initial temperature of the water in the cooling circuit, and therefore on the outside temperature; on average this phase may continue for between 30 and 120 seconds, depending on the initial temperature. This enables the engine to reach a minimum steady state temperature gradually, without the risk of thermal shock.

Next a fast WARM-UP phase is activated.

The engine is made to run at a predefined speed (for example 1000 rpm), the retarder is activated and some parameters are set, such as braking torque. The retarder generates a reverse braking torque that slows the speed of the drive shaft, but the speed of the latter remains constant as it is controlled by the engine control unit. The operating condition can thus be like that of an engine on a dynamometer bench with simulation of a transmission load. The system warms up more quickly because it is subject to the braking load of the retarder.

In this phase the engine speed varies. The variations in rpm are controlled in relation to the temperature of the engine cooling water according to a predefined map, with values that range, for example, from 800 to 1200 rpm.

The retarder actuation pressure (which is directly proportional to the braking torque delivered thereby) is adjusted according to the changes in speed on the basis of a predefined map so as to control the braking power (and thus the thermal power) and define the heating gradient to be applied to the vehicle. Typical actuation pressure values may, for example, be between 3 and 4 bar.

The difference between the temperature of the transmission oil and that of the cooling water is also controlled: as long as this difference is below a given value $\Delta T_{STOP}$, the retarder remains active; when the difference exceeds said value, the retarder is deactivated and the engine is controlled so as to operate at a given rpm, until the difference falls below another value $\Delta T_{START}$, when the retarder is re-activated.

The two values $\Delta T_{STOP}$ and $\Delta T_{START}$ are different to keep into account the phenomenon of hysteresis.

This procedure is automatically deactivated when the oil and water reach a given preset operating temperature, for example 80° C.

If the vehicle is not used immediately, and the temperatures fall again, the procedure is repeated.

In any case, for safety reasons, even if just one of the initial conditions required in order to authorize the procedure is not satisfied, the system exits the procedure and the engine is made to idle.

Using sensors that are already installed in the vehicle, the control unit CNT processes data such as initial starting conditions, temperature of brake oil, transmission oil, engine cooling water, and executes the procedure according to this invention, supplying control signals in a conventional manner using a data transmission protocol called CAN (Control Area Network).

As mentioned earlier, conventional devices and parts that are already incorporated into the vehicle are used, and no further description of these is necessary. The only additional device that is required is the external activation switch, which may be controlled from a distance by means of a remote control device.

An appropriate software is loaded into the control unit in order to implement the procedure. From the description set forth above it will be possible for the person skilled in the art to embody such software using the ordinary programming techniques known in the art.

Therefore the procedure of the present invention can be advantageously implemented through a program for computer comprising program coding means for the implementation of one or more steps of the method, when this program is running on a computer. Therefore, it is understood that the scope of protection is extended to such a program for computer and in addition to a computer readable means having a recorded message therein, said computer readable means comprising program coding means for the implementation of one or more steps of the method, when this program is run on a computer.

It will be apparent to the person skilled in the art that other alternative and equivalent embodiments of the invention can be conceived and reduced to practice without departing from the true spirit of the invention. The method according to this invention is suitable for use in any vehicle, provided that it is equipped with a hydraulic retarder that is connected or can be connected to the engine and which may or may not be integrated in the transmission but that must, in any case, be installed and operate upstream of the transmission. The hydraulic retarder may also be installed separately, with its own heat exchanger.

Thus to generalize the diagram of the non-limitative example illustrated in FIG. 1, the retarder component RET can be placed outside the transmission assembly CMA, installed in an appropriate manner as known in the art, and be equipped with its own heat exchanger that transfers heat between the fluid (usually oil) of the retarder and the engine coolant; said heat exchanger is thus incorporated into the general engine coolant circuit.

Other fluids that must be heated, according to the specific application, can also be placed in contact with the engine coolant by means of an appropriate heat exchanger.

For these reasons the method according to this invention is not only suitable for use in special vehicles, but also, for example, in urban buses, where there is the additional requirement of heating the large passenger compartment quickly.

With low outdoor temperatures, the fact that the engine cooling water warms up more quickly when the vehicle is started means that the heat exchanger between the air in the passenger compartment and engine cooling water can start working sooner. The inside of the vehicle therefore warms up more quickly.

The advantages in connection with the use of this invention are clear.

In conclusion, the system according to the invention described above enables more power to be transferred to the cooling water, because in addition to that produced by the engine, it also uses the power requested by the Retarder, which is then transferred, through the heat exchanger, to the engine cooling water.

The two powers meet in the transmission heat exchanger and this speeds the warm-up phenomenon.

Furthermore, this invention envisages the use of existing components and only requires the addition of an external warm-up actuator switch, which may be controlled by means of a remote control device.

From the description set forth above it will be possible for the person skilled in the art to embody the invention without introducing any further construction details.

What is claimed is:

1. A method for managing the vehicle warm-up phase in a cold start situation, said vehicle being equipped with a hydraulic retarder with hydraulic circuit connected to a heat exchanger that exchanges heat with an engine coolant, said warm-up phase in a cold start situation comprising a step in which said hydraulic retarder is activated with the vehicle at a standstill, wherein it comprises an additional fast warm-up step of a brake oil by means of the exchange of heat with said engine coolant in an oil/coolant heat exchanger.

2. A method according to claim 1, wherein said activation step of said hydraulic retarder with the vehicle at a standstill comprises the following steps:
  checking that the vehicle is in the standstill condition;
  ignition of the engine with control of the rpm;
  activating said hydraulic retarder with control of the actuation pressure;
  controlling the temperature of said hydraulic circuit of the retarder and of the engine coolant;
  deactivating the retarder upon reaching a given temperature.

3. A method according to claim 2, wherein said step of checking that the vehicle is in the standstill condition comprises checking the initial conditions, i.e. that: the gear is in the neutral position; the ignition key is not inserted; the parking brake is engaged; the transmission output shaft speed is zero.

4. A method according to claim 2, wherein said step of ignition of the engine with control of the rpm comprises a first activation step prior to the activation of the hydraulic retarder.

5. A method according to claim 2, wherein said step of ignition of the engine with control of the rpm comprises adjusting the number of rpm in relation to the temperature of the coolant.

6. A method according to claim 2, wherein said step of activation of said hydraulic retarder with control of the actuation pressure comprises adjusting said actuation pressure in relation to a given braking torque.

7. A method according to claim 2, wherein said step of controlling the temperature of said hydraulic circuit of the retarder and of the engine coolant comprises measuring the difference between the temperature of said hydraulic circuit and that of said coolant: as long as this difference remains below a given value $\Delta T_{stop}$, causing the hydraulic retarder remaining active; when the difference exceeds the value $\Delta T_{stop}$, causing the hydraulic retarder being deactivated and the engine staying on at a given speed, until the difference falls below a value $\Delta T_{start}$ again, when the retarder is re-activated.

8. A method according to claim 3, wherein if one or more of said initial conditions for standstill are not fulfilled, the hydraulic retarder is deactivated and the engine is placed in the idling condition.

9. A method according to claim 1, wherein it comprises an additional fast warm-up step of the passenger compartment air circuit by means of the exchange of heat with said engine coolant in an air/coolant heat exchanger.

10. A device for managing the vehicle warm-up phase in a cold start situation, said vehicle being equipped with a hydraulic retarder with hydraulic circuit connected to a heat exchanger that exchanges heat with an engine coolant, comprising a control unit capable of activating said hydraulic retarder with the vehicle at a standstill, wherein said hydraulic retarder causes the fast warm-up of a brake oil by means of the exchange of heat with said engine coolant in an oil/coolant heat exchanger.

11. A device according to claim 10, wherein said control unit that activates said hydraulic retarder with the vehicle at a standstill comprises means for:
  a checker which checks that the vehicle is in the standstill condition;
  a starter which starts the engine and controls the rpm;

an activator activating said hydraulic retarder and controlling the actuation pressure;

a controller of the temperature of said hydraulic circuit of the retarder and of the engine coolant;

a deactivator deactivating the retarder upon reaching a given temperature.

12. A device according to claim 11, wherein said checker which checks that the vehicle is in the standstill condition also checks the initial conditions, i.e. that: the gear is in the neutral position; the ignition key is not inserted; the parking brake is engaged; the transmission output shaft speed is zero.

13. A device according to claim 11, wherein said starter which starts the engine and controls the rpm in a first activation phase controls said idling condition.

14. A device according to claim 11, wherein said starter which starts the engine and controls the rpm also controls the engine speed in relation to the temperature of the coolant.

15. A device according to claim 11, wherein said activator activating said hydraulic retarder and controlling the actuation pressure, also controls said actuation pressure in relation to a braking torque.

16. A device according to claim 11, wherein said controller of the temperature of said hydraulic circuit of the retarder and of the engine coolant controls the difference between the temperature of said hydraulic circuit and that of the coolant, so that as long as this difference remains below a given value $\Delta T_{stop}$, they keep the hydraulic retarder in the activated condition; when the difference exceeds the value $\Delta T_{stop}$, they deactivate the hydraulic retarder and keep the engine running at a given rpm, until the difference falls below a given value $\Delta T_{start}$, at which point they re-activate the retarder.

17. A device according to claim 12, wherein if one or more of said initial conditions for standstill are not fulfilled, the hydraulic retarder is deactivated and the engine is placed in the idling condition.

18. A device according to claim 10, wherein it comprises an additional second enabler of the fast warm-up of the passenger compartment air circuit by means of the exchange of heat with said engine coolant in an air/coolant heat exchanger.

19. A device according to claim 10, wherein it comprises an additional third enabler of the fast warm-up of one or more additional fluids by means of the exchange of heat with said engine coolant in one or more corresponding heat exchangers that exchange heat between said one or more additional fluids and said coolant.

20. A vehicle comprising a device for managing the warm-up phase in a cold start situation, said vehicle being equipped with a hydraulic retarder with hydraulic circuit connected to a heat exchanger that exchanges heat with an engine coolant, wherein it comprises a control unit capable of activating said hydraulic retarder with the vehicle at a standstill, wherein said hydraulic retarder causes the fast warm-up of a brake oil by means of the exchange of heat with said engine coolant in an oil/coolant heat exchanger.

21. A vehicle according to claim 20, wherein said control unit that activates said hydraulic retarder with the vehicle at a standstill comprises:

a checker which checks that the vehicle is in the standstill condition;

a starter which starts the engine and controls the rpm;

an activator activating said hydraulic retarder and controlling the actuation pressure;

a controller of the temperature of said hydraulic circuit of the retarder and of the engine coolant;

a deactivator deactivating the retarder upon reaching a given temperature.

22. A computer program comprising a computer program code that when is run on a computer is adapted to perform the steps of managing the vehicle warm-up phase in a cold start situation, said vehicle being equipped with a hydraulic retarder with hydraulic circuit connected to a heat exchanger that exchanges heat with an engine coolant, said warm-up phase in a cold start situation comprising a step in which said hydraulic retarder is activated with the vehicle at a standstill, wherein it comprises an additional fast warm-up step of a brake oil by means of the exchange of heat with said engine coolant in an oil/coolant heat exchanger.

23. A computer program as in claim 22, wherein said activation step of said hydraulic retarder with the vehicle at a standstill comprises the following steps:

checking that the vehicle is in the standstill condition;

ignition of the engine with control of the rpm;

activating said hydraulic retarder with control of the actuation pressure;

controlling the temperature of said hydraulic circuit of the retarder and of the engine coolant;

deactivating the retarder upon reaching a given temperature.

* * * * *